United States Patent
Hammer et al.

(10) Patent No.: US 10,467,078 B2
(45) Date of Patent: Nov. 5, 2019

(54) CRASH DUMP EXTRACTION OF GUEST FAILURE

(71) Applicant: Red Hat Israel, Ltd., Ra'anana (IL)

(72) Inventors: Gal Hammer, Ra'anana (IL); Marcel Apfelbaum, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 105 days.

(21) Appl. No.: 15/599,190

(22) Filed: May 18, 2017

(65) Prior Publication Data

US 2018/0336085 A1 Nov. 22, 2018

(51) Int. Cl.
*G06F 11/00* (2006.01)
*G06F 11/07* (2006.01)
*G06F 9/455* (2018.01)
*G06F 16/188* (2019.01)

(52) U.S. Cl.
CPC ...... *G06F 11/0778* (2013.01); *G06F 9/45558* (2013.01); *G06F 11/0712* (2013.01); *G06F 16/188* (2019.01); *G06F 2009/45575* (2013.01); *G06F 2009/45579* (2013.01); *G06F 2009/45591* (2013.01)

(58) Field of Classification Search
CPC ............ G06F 11/0751; G06F 11/0766; G06F 11/0772; G06F 11/0778; G06F 11/08; G06F 11/14; G06F 11/0769; G06F 11/0775; G06F 11/0784; G06F 11/0787
USPC ........................................ 714/14, 16, 22, 48
See application file for complete search history.

(56) References Cited

U.S. PATENT DOCUMENTS

| | | | |
|---|---|---|---|
| 7,383,471 B2 | 6/2008 | Dall | |
| 8,671,405 B2 | 3/2014 | Nicholas et al. | |
| 8,707,305 B2 | 4/2014 | Hendel | |
| 8,719,639 B2 | 5/2014 | Shimogawa | |
| 8,719,642 B2 | 5/2014 | Laor | |
| 9,183,093 B2 | 11/2015 | Antony | |
| 9,529,662 B1 | 12/2016 | Wangkhem et al. | |
| 2011/0145380 A1* | 6/2011 | Glikson | G06F 9/4856 709/223 |
| 2011/0225459 A1 | 9/2011 | Fahrig et al. | |
| 2011/0246986 A1* | 10/2011 | Nicholas | G06F 11/0712 718/1 |
| 2015/0161008 A1* | 6/2015 | Antony | G06F 11/1448 714/16 |
| 2016/0132443 A1* | 5/2016 | Davda | G06F 13/28 710/308 |
| 2018/0157550 A1* | 6/2018 | Ivanov | G06F 11/0712 |

OTHER PUBLICATIONS

Mohammed Raffic, "How to Generate Crash Dump for VMware Virtual Machine Guest OS Hung Issues", Jul. 1, 2014, http://www.vmwarearena.com/how-to-generate-crash-dump-for-vmware-virtual-machine-guest-os-hung-issues/.

* cited by examiner

*Primary Examiner* — Sarai E Butler
(74) *Attorney, Agent, or Firm* — Haynes and Boone, LLP

(57) ABSTRACT

An example method of providing a crash dump file upon a crash of a guest OS includes receiving, by a hypervisor, a notification that a guest OS running on a virtual machine has crashed. The notification is from the guest OS, and the virtual machine and the hypervisor run on a host machine. The method also includes in response to receiving the notification, writing, by the hypervisor, a crash dump file associated with the guest OS crash to a host file system of the host machine.

19 Claims, 5 Drawing Sheets

CRASH DUMP EXTRACTION OF GUEST FAILURE

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). An OS is a set of programs that manages computer hardware resources and provides common services for application software. For hardware functions such as input and output and memory allocation, the OS typically acts as an intermediary between application programs and hardware. OSs may be found on a variety of devices, including desktop computers, servers, smartphones, video game consoles, and so forth.

A host machine (e.g., computer or server) is typically enabled to simultaneously run one or more VMs, where each VM may be used by a local or remote client. The host machine allocates a certain amount of the host's resources to each of the VMs. Each VM may use the allocated resources to execute applications, including an OS known as a guest OS or guest. The hypervisor virtualizes the underlying hardware of the host machine or emulates hardware devices, making the use of the VM transparent to the guest or the remote client that uses the VM. Typically, a hypervisor manages allocation and virtualization of computer resources and performs context switching, as may be necessary, to cycle between various VMs.

BRIEF SUMMARY

The present disclosure provides techniques to provide a crash dump file upon a crash of a guest operating system (OS).

According to an example, a method of providing a crash dump file upon a crash of a guest OS includes receiving, by a hypervisor, a notification that a guest OS running on a virtual machine has crashed. The notification is from the guest OS. The virtual machine and the hypervisor run on a host machine. The method includes in response to receiving the notification, writing, by the hypervisor, a crash dump file associated with the guest OS crash to a host file system of the host machine.

According to another example, a system for providing a crash dump file upon a crash of a guest OS includes a guest OS running on a virtual machine. The guest OS sends a notification that the guest OS has crashed. The system includes a hypervisor that receives the notification. In response to the notification, the hypervisor writes a crash dump file associated with the guest OS crash to a host file system of a host machine. The virtual machine and the hypervisor run on the host machine.

According to another example, a non-transitory machine-readable medium includes a plurality of machine-readable instructions that when executed by one or more processors are adapted to cause the one or more processors to perform a method including: receiving, by a hypervisor, a notification that a guest OS running on a virtual machine has crashed, the notification being from the guest OS, and the virtual machine and the hypervisor running on a host machine; and in response to receiving the notification, writing, by the hypervisor, a crash dump file associated with the guest OS crash to a host file system of the host machine.

BRIEF DESCRIPTION OF THE DRAWINGS

The accompanying drawings, which form a part of the specification, illustrate examples of the disclosure and together with the description, further serve to explain the principles of the examples. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different examples, or examples, for implementing different features of the present disclosure. Some examples may be practiced without some or all of these specific details. Specific examples of components, modules, and arrangements are described below to simplify the present disclosure. These are, of course, merely examples and are not intended to be limiting.

A problem that arises in virtualization systems is the handling of guest OS crash events and the eventual review of crash dump files associated with the guest OS crash events. If an OS system of a VM has a problem or some type of bug, it can be difficult, and sometimes impossible, to detect the source of the crash. Detecting the source of a crash is very important, as getting support from outside the customer's network. It may be advantageous to know the source of the problem to solve the issues leading to the crash. A crash dump file may detail the source and conditions leading to a crash, and is typically saved in one of the hard drives owned by the OS. In case the OS is running on a VM it will be saved in one of the virtual disks. Each virtual disk is tied to a physical storage location on the host side and is called a VM image. A single VM can have one or more images, one per virtual hard drive.

In some cases the guest OS is not responsive due to the crash and any data associated with the crash, and stored in the VM image, is thereby inaccessible. In a virtualized environment, however, there is no efficient mechanism for removing crash dump files created by a VM and stored at the VM image. As a result, a mechanism to automate the provision of a crash dump file to a source outside of the VM upon a crash event of the VM would be beneficial. A crash dump file may provide the state of the guest OS at a time of the crash. When the crash occurs, the guest OS may copy as much memory as it can in order to understand that snapshot in time of what occurred during the crash. For example, information such as which processes were running, their state, etc. may be determined by looking in the crash dump file.

Figure 1:
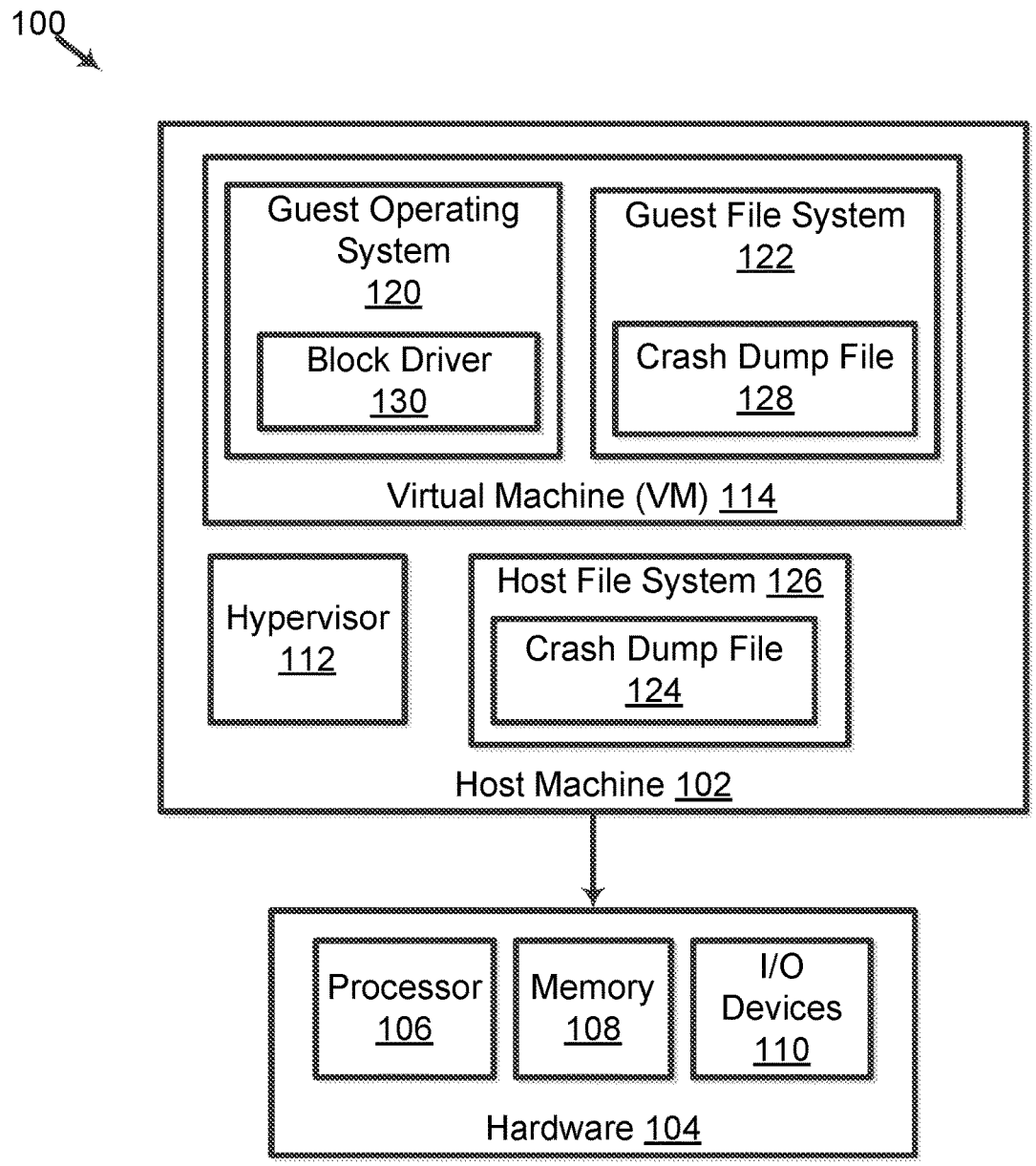
FIG. 1 is a block diagram illustrating an example system for providing a crash dump file upon a crash of a guest OS.

FIG. 1 is a block diagram illustrating an example system 100 for providing a crash dump file upon a crash of a guest OS. System 100 is coupled to hardware 104 such as a processor 106 for executing software (e.g., machine-readable instructions) and using or updating data stored in memory 108. Hardware 104 may include one or more processors 106. A "processor" may also be referred to as a "central processing unit," "CPU" or "physical processor" herein. A processor shall refer to a device capable of executing instructions encoding arithmetic, logical, or input/output (I/O) operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 108 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system and various other software applications. Hardware 104 may include other I/O devices 110.

In FIG. 1, host machine 102 includes hypervisor 112 and VM 114. Host machine 102 may host one or more virtual machines (VMs) that run applications and services. Each of host hypervisor 112 and VM 114 is executable on a computing device having at least one processor and memory. VM 114 includes a guest operating system (OS) 120. Although one VM and one hypervisor are illustrated is host machine 102, other examples including more than one VM and/or more than one hypervisor executable on host machine 102 are within the scope of the present disclosure. For example, hypervisor 112 may allow multiple OSs, called guests or guest OSs, to run on the same physical system by offering virtualized hardware to the guest OSs. The host machine may run multiple OSs, concurrently and in isolation from other programs on a single system. A guest OS 120 may run a different OS than another guest OS 120 executing on the same host machine. Additionally, the guest OS 120 running on a VM may also be different from the host OS running on host machine 102. The host OS or guest OS 120 may include, for example, MICROSOFT® WINDOWS®, LINUX®, SOLARIS®, and MAC® OSs. Trademarks are the property of their respective owners.

One or more guest OSs 120 and application stacks may be run on top of hypervisor 112. In the example illustrated in FIG. 1, VM 114 is the platform (e.g., virtual hardware) on which guest OS 120 runs. Hypervisor 112 owns the real system resources and makes them available to one or more guest OSs that alternately execute on the same hardware.

Hypervisor 112 includes a hypervisor memory, which may include memory locations that map to physical memory locations in memory 108.

Hypervisor 112 manages hardware resources and arbitrates requests from one or more guest OSs and application stacks. In an example, hypervisor 112 presents a virtual set of CPU, memory, I/O, and disk resources to each guest OS either based on the actual physical hardware or based on a standard and consistent selection of custom hardware. A VM has its own address space in memory, its own processor resource allocation, and its own device input/output (I/O) using its own virtual device drivers. Hypervisor 112 may map a virtual resource or state (e.g., registers, memory, or files) to real resources in the underlying machine. For example, hypervisor 112 may present a guest memory to guest OS 120, and memory locations of the guest memory may be mapped to physical memory locations in memory 108.

During operation, VM 114 may encounter bugs or other software or virtual hardware problems that cause guest OS 120 to crash. Generally, upon a crash of the guest OS 120, a crash dump file is created and stored in the VM image. The crash dump file is a file that contains a snapshot of useful low-level information about the system that can be used to debug the root cause of the problem. Generally, the guest OS 120 itself generates the crash dump file upon receiving an indication of an error in the system. It can be difficult, however, to access the crash dump file if VM 114 is non-responsive due to the crash. Furthermore, it is not ideal to have to access all of the standard files of a VM just to obtain the crash dump file.

The present disclosure provides techniques for providing a crash dump file upon a crash of guest OS 120. Guest OS 120 includes a block driver 130 that sends a notification to the hypervisor. In an example, block driver 130 is a paravirtualized driver, as opposed to a regular emulated driver. The notification notifies hypervisor 112 that guest OS 120 has crashed. In response to the notification, hypervisor 112 may write a crash dump file 124 associated with the guest OS crash to a host file system 126 of host machine 102 and may also write a crash dump file 128 associated with the guest OS crash to a guest file system 122 of host machine 102.

Crash dump 124 is accessible outside of VM 114 and may be accessed without running VM 114 again. Additionally, if for some reason VM 114 cannot be reloaded, crash dump file 124 is still accessible because it is stored outside of VM 114. In some examples, rather than guest OS 120 writing crash dump file 128 to guest file system 122, hypervisor 112 may do so and also duplicate this file for storage on host file system 126. In some examples, crash dump file 124 may be stored in a hard disk and/or selected by a user and stored in user space. In some examples, crash dump file 124 and crash dump file 128 are duplicates. In an example, crash dump file 124 may be opened using a debugging tool, without reloading VM 114.

Figure 2:
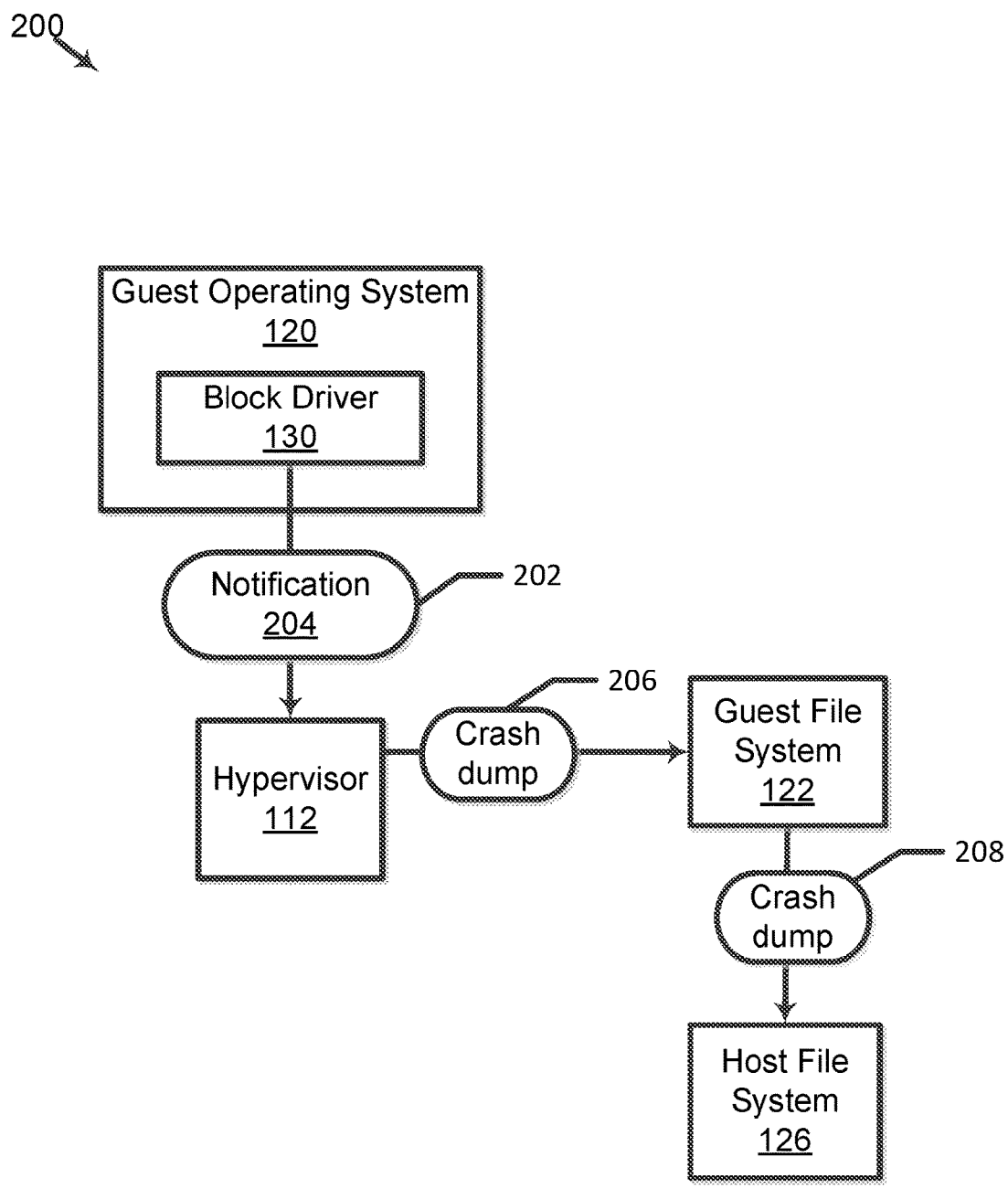
FIG. 2 is an example process flow of providing a crash dump file upon a crash of a guest OS.

FIG. 2 is an example process flow 200 of providing a crash dump file upon a crash of a guest OS. At action 202, block driver 130 sends a notification 204 to hypervisor 112. Notification 204 provides an indication that guest OS 120 running on VM 114 has crashed. In an example, guest OS 120 loads block driver 130 in a special mode if guest OS 120 detects that guest OS 120 will crash. Based on being loaded in the special mode, block driver 130 may send notification 204. In another example, block driver 130 registers with guest OS 120 to receive these notifications, and forwards the notifications to hypervisor 112. In this example, block driver 130 may register as a crash notifier with guest OS 120 to receive notifications.

Hypervisor 112 receives notification 204 that guest OS 120 running on VM 112 has crashed. At action 206, in response to receiving notification 204, hypervisor 112 writes the crash dump associated with the guest OS crash to guest file system 122. Guest file system 122 is a simulation of a physical drive. At action 208, in response to receiving notification 204, hypervisor 112 writes the crash dump associated with the guest OS crash to host file system 126.

Figure 3:
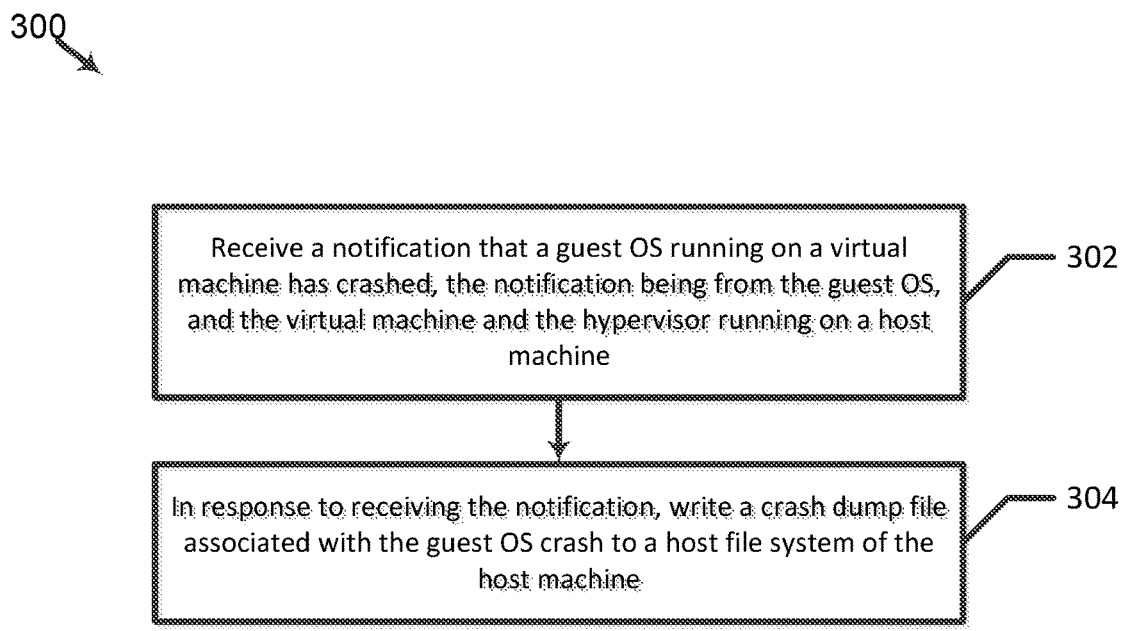
FIG. 3 is a flowchart illustrating an example method of providing a crash dump upon a crash of a guest OS.

FIG. 3 is a flowchart illustrating an example method 300 of providing a crash dump upon a crash of a guest OS. Method 300 is not meant to be limiting and may be used in other applications. Method 300 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 300 may be performed on system 100 illustrated in FIG. 1. The order of the actions described below may also be performed according to different orderings. In yet other examples, additional actions may be added and/or actions that are described may be removed.

In FIG. 3, method 300 includes blocks 302 and 304. In a block 302, hypervisor 112 receives a notification that a guest OS running on a virtual machine has crashed, the notification being from the guest OS, and the virtual machine and the hypervisor running on a host machine. In a block 304, in response to receiving the notification, hypervisor 112 writes crash dump file 124 associated with the guest OS 120 crash to host file system 126 of host machine 102.

In some examples, one or more actions illustrated in blocks 302 and 304 may be performed for any number of instances of one or more guest OS crashes. It is also understood that additional processes may be performed before, during, or after steps 302 and/or 304 discussed above. It is also understood that one or more of the steps of method 300 described herein may be omitted, combined, or performed in a different sequence as desired.

Figure 4:
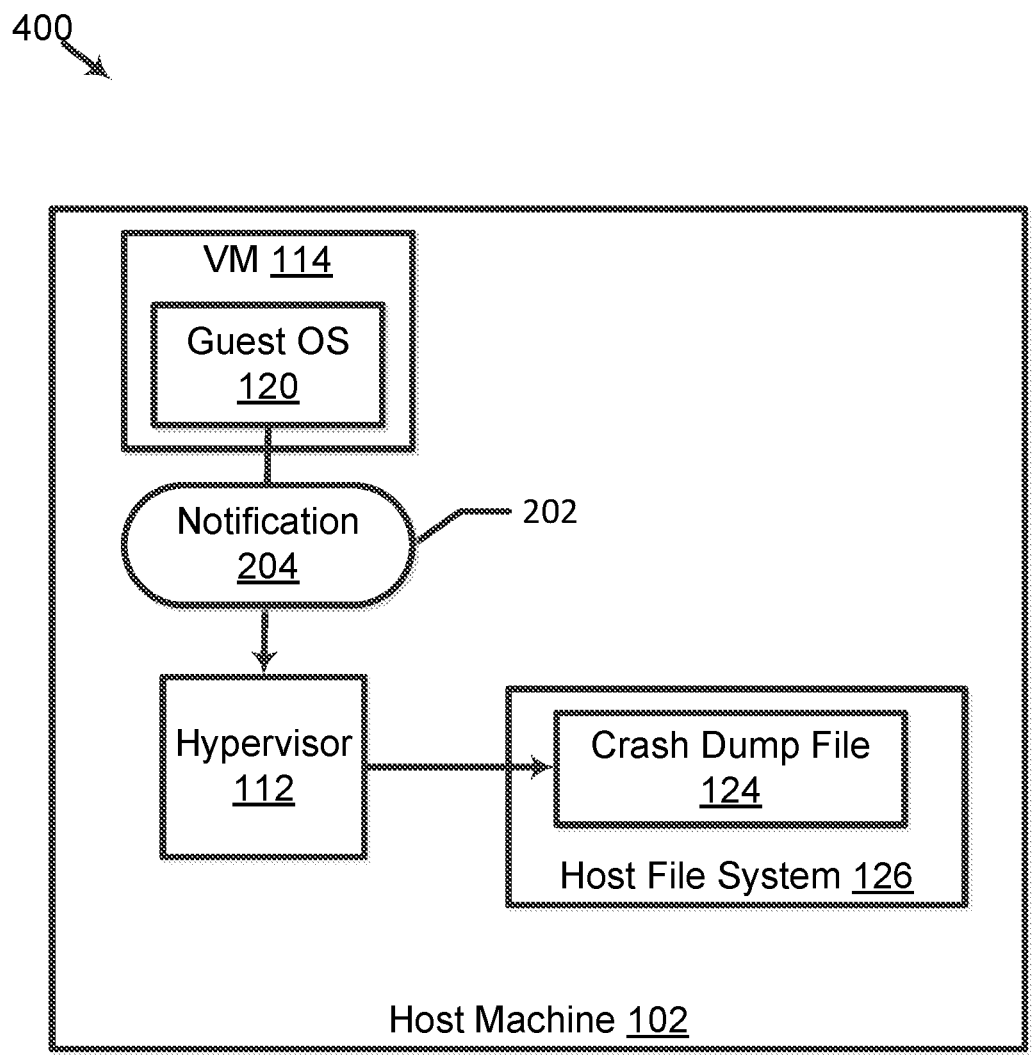
FIG. 4 is a block diagram illustrating an example system for providing a crash dump file upon a crash of a guest OS.

FIG. 4 is a block diagram illustrating an example system 400 for providing a crash dump file upon a crash of a guest OS. In FIG. 4, guest OS 120 runs on VM 114 and sends a notification 204 that the guest OS has crashed. Hypervisor 112 receives notification 204. In response to the notification, hypervisor 112 writes crash dump file 124 associated with the guest OS crash to host file system 126 of host machine 102. Additionally, VM 114 and hypervisor 112 run on host machine 102.

As discussed above and further emphasized here, FIGS. 1-4 are merely examples, which should not unduly limit the scope of the claims.

Figure 5:
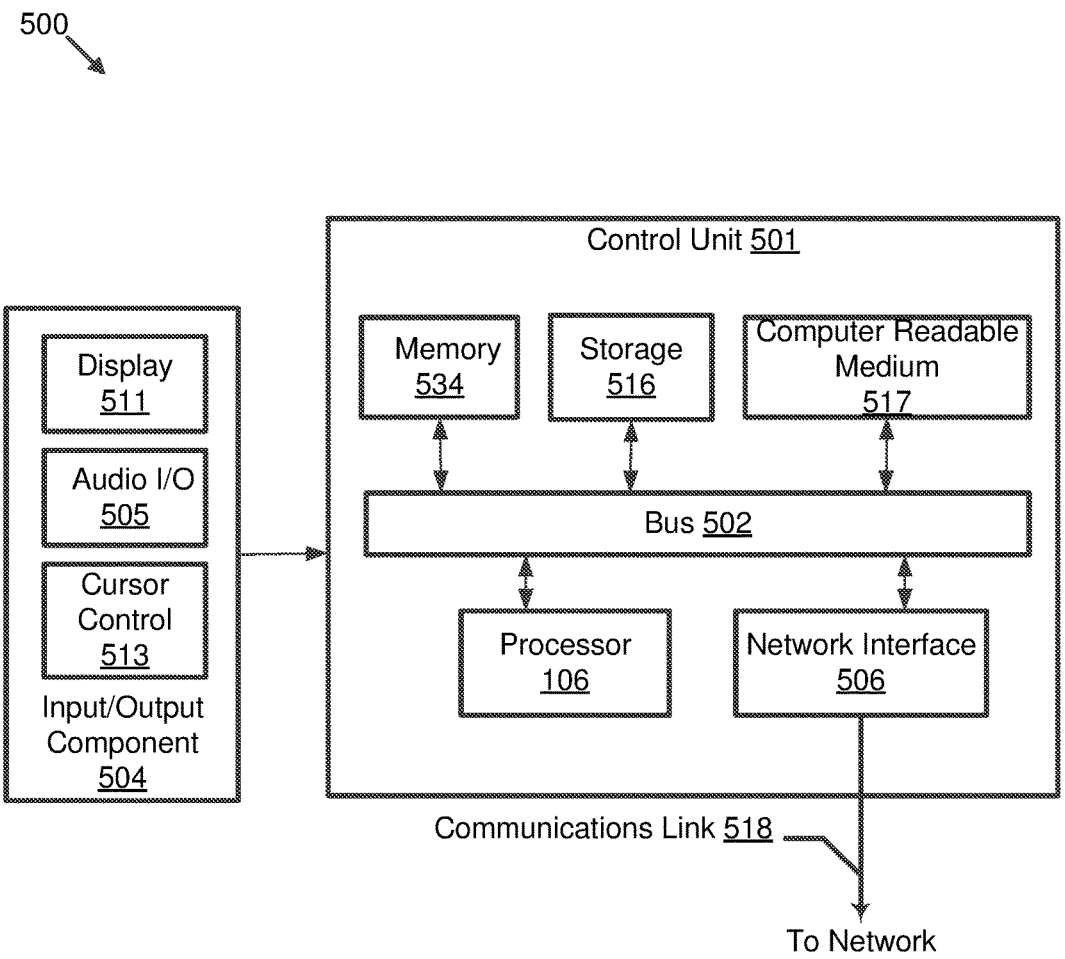
FIG. 5 is a block diagram of an electronic system suitable for implementing one or more examples of the present disclosure.

FIG. 5 is a block diagram of an example computer system 500 suitable for implementing any of the examples disclosed herein. In various implementations, hypervisor 112, VM 114, and guest 120 may be implemented on computer system 500. The computer system 500 may include one or more processors 106. Computer system 500 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to a client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 for processing user actions, such as selecting keys from a keypad/keyboard or selecting one or more buttons or links, etc., and sending a corresponding signal to bus 502. I/O component 504 may also include an output component such as a display 511, and an input control such as a cursor control 513 (such as a keyboard, keypad, mouse, etc.). In some examples, a user may use I/O component 504 to launch VM 114.

An audio I/O component 505 may also be included to allow a user to use voice for inputting information by converting audio signals into information signals. Audio I/O component 505 may allow the user to hear audio. A transceiver or network interface 506 transmits and receives signals between computer system 500 and other devices via a communications link 518 to a network. In an example, the transmission is wireless, although other transmission mediums and methods may also be suitable.

A processor 106, which may be a micro-controller, digital signal processor (DSP), or other processing component, processes these various signals, such as for display on display 511 of computer system 500 or transmission to other devices via communication link 518. A processor may also control transmission of information, such as cookies or IP addresses, to other devices.

Components of computer system 500 also include a system memory component 534 (e.g., RAM), a static storage component 516 (e.g., ROM), and/or a computer readable medium 517. Computer system 500 performs specific operations by one or more processors 106 and other components by executing one or more sequences of instructions contained in system memory component 534. Logic may be encoded in computer readable medium 517, which may refer to any medium that participates in providing instructions to one or more processors 106 for execution. Such a medium may take many forms, including but not limited to, non-volatile media, volatile media, and transmission media.

In various implementations, non-volatile media include optical, or magnetic disks, or solid-state drives, volatile media include dynamic memory, such as system memory component 534, and transmission media include coaxial cables, copper wire, and fiber optics, including wires that include bus 502. In an example, the logic is encoded in non-transitory computer readable medium. Computer readable medium 517 may be any apparatus that can contain, store, communicate, propagate, or transport instructions that are used by or in connection with processor 106. Computer readable medium 517 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various examples of the present disclosure, execution of instruction sequences (e.g., method 300) to practice the present disclosure may be performed by computer system 500. In various other examples of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate example and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of providing a crash dump file upon a crash of a guest operating system (OS), comprising:
    registering a para-virtualized driver with a guest OS for receiving crash notifications associated with the guest OS, the guest OS running on a virtual machine;
    receiving, by a hypervisor, a notification from the para-virtualized driver, the virtual machine and the hypervisor running on a host machine;
    in response to receiving the notification, determining, by the hypervisor, that the guest OS has crashed; and
    in response to a determination that the guest OS has crashed, writing, by the hypervisor, a crash dump file associated with the guest OS crash to a host file system of the host machine.

2. The method of claim 1, further comprising:
    in response to determining that the guest OS has crashed, writing, by the hypervisor, the crash dump file to a guest file system of the host machine.

3. The method of claim 2, wherein writing the crash dump file to the host file system includes duplicating the crash dump file written to the guest file system and storing the duplicate crash dump file to the host file system.

4. The method of claim 2, wherein writing the crash dump file to the host file system includes writing a first crash dump file to the host file system, and writing the crash dump file to the guest file system includes writing a second crash dump file to the guest file system.

5. The method of claim 4, wherein the first and second crash dump files are duplicates.

6. The method of claim 4, wherein the first crash dump file is stored on a hard disk.

7. The method of claim 1, wherein the virtual machine is allocated an address space, and the host file system is outside of the address space allocated to the virtual machine.

8. A system for providing a crash dump file upon a crash of a guest operating system (OS), comprising:
    a para-virtualized driver that registers with a guest OS for receiving crash notifications associated with the guest OS and that forwards one or more of the crash notifications, the guest OS running on a virtual machine; and
    a hypervisor that receives a crash notification from the para-virtualized driver, wherein the hypervisor determines that the guest OS has crashed in response to receiving the crash notification, wherein the hypervisor writes a crash dump file associated with the guest OS crash to a host file system of a host machine in response to a determination that the guest OS has crashed, and wherein the virtual machine and the hypervisor run on the host machine.

9. The system of claim 8, wherein in response to receiving the crash notification, the hypervisor writes the crash dump file to a guest file system of the host machine.

10. The system of claim 9, wherein the hypervisor writes a first crash dump file to the host file system and writes a second crash dump file to the guest file system.

11. The system of claim 10, wherein the first and second crash dump files are duplicates.

12. The system of claim 10, wherein the first crash dump file is accessible via a debugging tool.

13. The system of claim 8, wherein the guest OS loads the para-virtualized driver in a special mode if the guest OS detects the guest OS crash.

14. The system of claim 13, wherein in response to being loaded in the special mode, the para-virtualized driver forwards the cash notification to the hypervisor.

15. The system of claim 8, wherein the virtual machine is allocated an address space, and the host file system is outside of the address space allocated to the virtual machine.

16. A machine-readable medium comprising a plurality of machine-readable instructions that when executed by one or more processors is adapted to cause the one or more processors to perform a method comprising:
    registering a para-virtualized driver with a guest OS for receiving crash notifications associated with the guest OS, the guest OS running on a virtual machine;
    receiving, by a hypervisor, a notification from the para-virtualized driver, the virtual machine and the hypervisor running on a host machine;
    in response to receiving the notification, determining, by the hypervisor, that the guest OS has crashed; and
    in response to a determination that the guest OS has crashed, writing, by the hypervisor, a crash dump file associated with the guest OS crash to a host file system of the host machine.

17. The machine-readable medium of claim 16, the method further comprising:

in response to receiving the notification, writing, by the hypervisor, the crash dump file to a guest file system of the host machine.

18. The machine-readable medium of claim 16, wherein writing the crash dump file to the host file system includes duplicating the crash dump file written to a guest file system of the host machine and storing the duplicate crash dump file to the host file system.

19. The machine-readable medium of claim 16, wherein the virtual machine is allocated an address space, and the host file system is outside of the address space allocated to the virtual machine.

\* \* \* \* \*